(12) United States Patent
Dzurnak et al.

(10) Patent No.: US 11,518,449 B2
(45) Date of Patent: Dec. 6, 2022

(54) MULTI-POSITION TAILGATE AND SUPPORT SYSTEM

(71) Applicant: Ford Global Technologies, LLC, Dearborn, MI (US)

(72) Inventors: Jessica Lee Dzurnak, Southfield, MI (US); William Julian Kistler, Detroit, MI (US); Matthew Paul Lamberson, Macomb, MI (US); Brian Kenneth Sullivan, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 17/007,339

(22) Filed: Aug. 31, 2020

(65) Prior Publication Data
US 2022/0063735 A1  Mar. 3, 2022

(51) Int. Cl.
| | |
|---|---|
| *B62D 33/033* | (2006.01) |
| *B62D 33/03* | (2006.01) |
| *B62D 33/037* | (2006.01) |
| *E05C 17/36* | (2006.01) |
| *B62D 33/027* | (2006.01) |

(52) U.S. Cl.
CPC ......... *B62D 33/03* (2013.01); *B62D 33/0273* (2013.01); *B62D 33/037* (2013.01); *E05C 17/36* (2013.01); *E05Y 2900/546* (2013.01)

(58) Field of Classification Search
CPC .. B62D 33/03; B62D 33/0273; B62D 33/037; B62D 33/033; E05C 17/36
See application file for complete search history.

(56) References Cited

U.S. PATENT DOCUMENTS

| | | | | |
|---|---|---|---|---|
| 5,645,310 A | * | 7/1997 | McLaughlin | B62D 35/001 296/180.5 |
| 5,707,095 A | * | 1/1998 | Pribak | B62D 33/037 292/264 |
| 5,934,727 A | * | 8/1999 | Store | B62D 33/0273 296/26.11 |
| 6,068,321 A | * | 5/2000 | Ooms | B62D 33/0273 296/57.1 |
| 6,196,609 B1 | * | 3/2001 | Bowers | B62D 33/0273 296/57.1 |
| 6,267,429 B1 | * | 7/2001 | Kuzmich | B60P 1/435 296/57.1 |

(Continued)

*Primary Examiner* — Gregory A Blankenship
(74) *Attorney, Agent, or Firm* — Vichit Chea; Carlson, Gaskey & Olds, P.C.

(57) ABSTRACT

A tailgate assembly for a vehicle includes, among other things, a tailgate configured to pivot relative to a vehicle body between a closed position, a fully open position, and a secondary position that is between the closed position and the fully open position. The assembly further includes a cable device having a tailgate connector and a vehicle connector. The tailgate connector is coupled to the tailgate. The vehicle connector couples to a sidewall of the vehicle in first position to support the tailgate in the fully open position. The vehicle connector couples to the sidewall of the vehicle in a second position to support the tailgate in a secondary position. The first position is vertically below the second position. The assembly still further includes a bracket that blocks removal of the tailgate from the vehicle body when the tailgate is in the fully open position and when the tailgate is in the secondary position.

15 Claims, 7 Drawing Sheets

(56) References Cited

U.S. PATENT DOCUMENTS

| | | | | |
|---|---|---|---|---|
| 6,450,559 | B1* | 9/2002 | Renke | B60P 7/08 |
| | | | | 296/57.1 |
| 6,607,232 | B2* | 8/2003 | Katulka | B62D 35/007 |
| | | | | 296/57.1 |
| 8,075,038 | B2* | 12/2011 | Zielinsky | B62D 33/0273 |
| | | | | 296/57.1 |
| 8,696,046 | B2* | 4/2014 | Sackett | B62D 33/0273 |
| | | | | 296/57.1 |
| 9,139,236 | B2 | 9/2015 | Waskie et al. | |
| 9,174,684 | B1* | 11/2015 | Waskie | B62D 33/03 |
| 9,248,871 | B1 | 2/2016 | Waskie et al. | |
| 9,278,718 | B1* | 3/2016 | Cooper | E05C 17/36 |
| 9,522,704 | B1* | 12/2016 | Krajenke | B62D 33/0273 |
| 9,623,803 | B1* | 4/2017 | Martins | B60R 3/02 |
| 10,577,030 | B1* | 3/2020 | Santana | B62D 33/0273 |
| 2011/0181068 | A1* | 7/2011 | Zielinsky | B60P 1/26 |
| | | | | 296/57.1 |
| 2015/0115644 | A1* | 4/2015 | Waskie | B62D 33/0273 |
| | | | | 296/57.1 |
| 2016/0160553 | A1* | 6/2016 | Nania | E05F 15/627 |
| | | | | 296/50 |
| 2017/0100994 | A1* | 4/2017 | McAninch | B62D 33/0273 |
| 2018/0290693 | A1* | 10/2018 | Ogden | B62D 33/037 |
| 2020/0062167 | A1* | 2/2020 | Campbell | B60P 7/0807 |
| 2020/0087962 | A1* | 3/2020 | Trentin | E05D 7/1044 |
| 2020/0240184 | A1* | 7/2020 | Hemphill | E05C 17/365 |
| 2020/0399943 | A1* | 12/2020 | Ulewicz | B62D 33/0273 |
| 2021/0016844 | A1* | 1/2021 | Ogden | B62D 33/0273 |
| 2022/0063735 | A1* | 3/2022 | Dzurnak | B62D 33/0273 |

* cited by examiner

MULTI-POSITION TAILGATE AND SUPPORT SYSTEM

TECHNICAL FIELD

This disclosure relates generally to a tailgate for a vehicle and, more particularly, to a tailgate that can be held in a secondary position that is between a fully open and a closed position.

BACKGROUND

Vehicles, such as pickup trucks, can include a cargo bed. A tailgate can enclose one end of the cargo bed when the tailgate is in a closed position. The tailgate can pivot from the closed position to a fully open position where the tailgate is substantially horizontal. Cables can extend from a vehicle body to the tailgate to help to hold the tailgate in the fully open position. Some vehicles permit looping the cables around a fitting on the vehicle body to hold the tailgate assembly in a secondary position.

SUMMARY

A tailgate assembly for a vehicle according to an exemplary aspect of the present disclosure includes, among other things, a tailgate configured to pivot relative to a vehicle body between a closed position, a fully open position, and a secondary position that is between the closed position and the fully open position. The assembly further includes a cable device having a tailgate connector and a vehicle connector. The tailgate connector is coupled to the tailgate. The vehicle connector couples to a sidewall of the vehicle in first position to support the tailgate in the fully open position. The vehicle connector couples to the sidewall of the vehicle in a second position to support the tailgate in a secondary position. The first position is vertically below the second position. The assembly still further includes a bracket that blocks removal of the tailgate from the vehicle body when the tailgate is in the fully open position and when the tailgate is in the secondary position.

In another example of the foregoing assembly, the tailgate pivots relative to the vehicle body about a pivot axis. The bracket extends circumferentially about the pivot axis.

In another example of any of the foregoing assemblies, the bracket extends circumferentially at least 180 degrees about the pivot axis.

In another example of any of the foregoing assemblies, the bracket includes a hook-shaped finger portion that extends at least partially about the pivot axis.

Another example of any of the foregoing assemblies includes a mechanical fastener that secures the bracket to the tailgate.

In another example of any of the foregoing assemblies, the tailgate is vertically aligned when in the closed position, and is horizontally aligned when in the fully open position.

In another example of any of the foregoing assemblies, when the tailgate is in the secondary position, an uppermost area of the tailgate is substantially vertically aligned with an uppermost area of a wheel well of the vehicle sidewall.

In another example of any of the foregoing assemblies, the vehicle connector couples to a striker of the sidewall to support the tailgate in the secondary position.

In another example of any of the foregoing assemblies, a latch on the tailgate engages the striker to hold the tailgate assembly in the closed position.

In another example of any of the foregoing assemblies, the second position is vertically higher than the first position.

In another example of any of the foregoing assemblies, the cable device includes a cable extending from the tailgate connector to the vehicle connector.

In another example of any of the foregoing assemblies, the cable device includes a first cable device coupled to a passenger side of the tailgate and a second cable device coupled to a driver side of the tailgate.

Another example of any of the foregoing assemblies includes a mechanical fastener. The vehicle connector includes an aperture that receives the mechanical fastener to secure the vehicle connector to the sidewall when the tailgate is in the fully open position. The aperture receives a striker when the tailgate is in the secondary position.

In another example of any of the foregoing assemblies, the cable device extends linearly from the tailgate connector to the vehicle connector when the tailgate is in the fully open position and when the tailgate is in the secondary position.

A tailgate support system according to another exemplary aspect of the present disclosure includes, among other things, a cable extending from a tailgate connector to a vehicle connector. The tailgate connector is configured to couple to a tailgate of a vehicle. The vehicle connector is configured to couple to a vehicle sidewall at a first position when the tailgate is in a fully open position, and to couple to the vehicle sidewall at a second position when the tailgate is in a secondary position. The second position is vertically higher than the first position. The vehicle connector includes an aperture that receives a mechanical fastener when the vehicle connector is coupled to the vehicle sidewall at the first position. The aperture receives a striker of the vehicle to couple the vehicle connector to the vehicle sidewall in the second position.

Another example of any of the foregoing system includes a bracket configured to block removal of the tailgate from the vehicle body when the tailgate is in the fully open position and when the tailgate is in the secondary position.

A method of attaching a tailgate to a vehicle according to yet another exemplary aspect of the present disclosure includes, among other things, providing a tailgate support system having a tailgate connector, a vehicle connector, and a cable member extending therebetween. The method then includes supporting a tailgate in a fully open position using the tailgate support system. The tailgate support system has the tailgate connector coupled to a tailgate and the vehicle connector coupled to a sidewall of a vehicle in a first position when supporting the tailgate in the fully open position. The method still further includes decoupling the vehicle connector from a vehicle sidewall, coupling the vehicle connector to a striker of the vehicle sidewall in a second position that is vertically above the first position, and supporting the tailgate in a secondary position when the vehicle connector is coupled to the striker.

Another example of the foregoing method includes supporting a sheet of material on an uppermost area of the tailgate when the tailgate is in the secondary position.

In another example of any of the foregoing methods, the tailgate is pivotably coupled to the vehicle, and the method includes using a bracket attached to the tailgate to block the tailgate from decoupling from the vehicle when the tailgate is in the fully open position and when the tailgate is in the secondary position.

In another example of any of the foregoing methods, the tailgate pivots relative to the vehicle body about a pivot axis. The bracket includes a hook-shaped finger portion that extends at least partially about the pivot axis of the tailgate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary tailgate for a vehicle. The tailgate can be placed in a secondary position to support certain types of loads, such as sheets of plywood or drywall. For example, a load of drywall sheets can span between the tailgate in the secondary position and on wheel wells of the vehicle. The secondary position is between a closed position and a fully open position.

Figure 1:
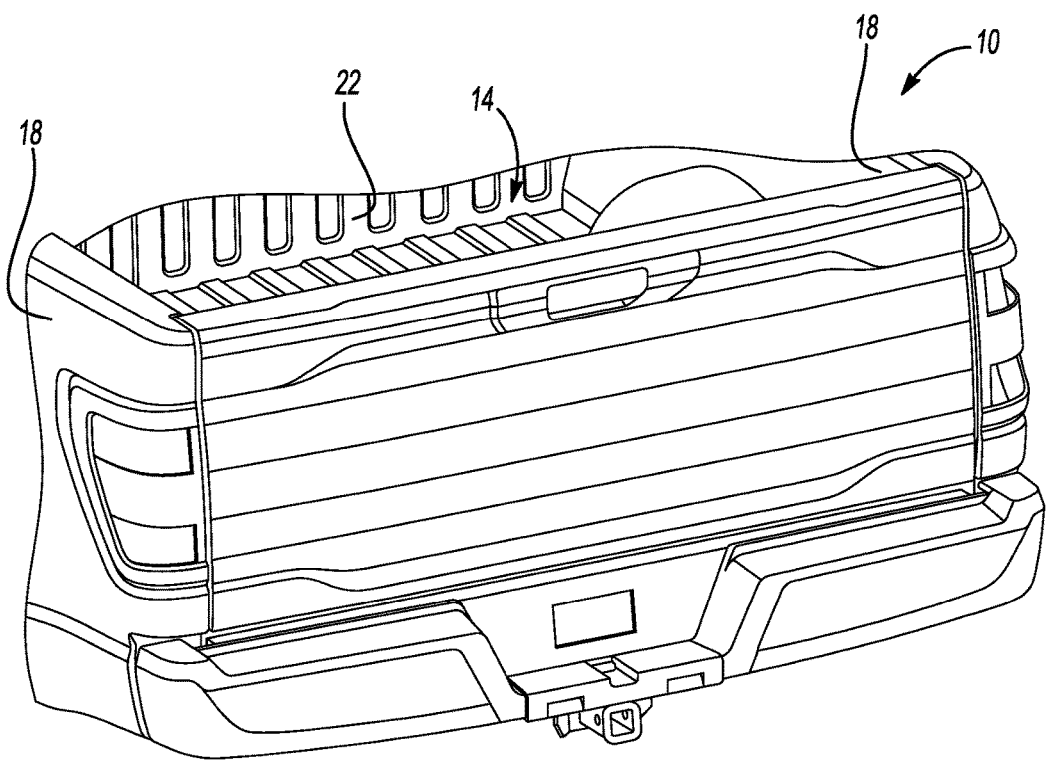
FIG. 1 illustrates a rear perspective view of a pickup truck having a cargo bed and a tailgate in a closed position.
Figure 2:
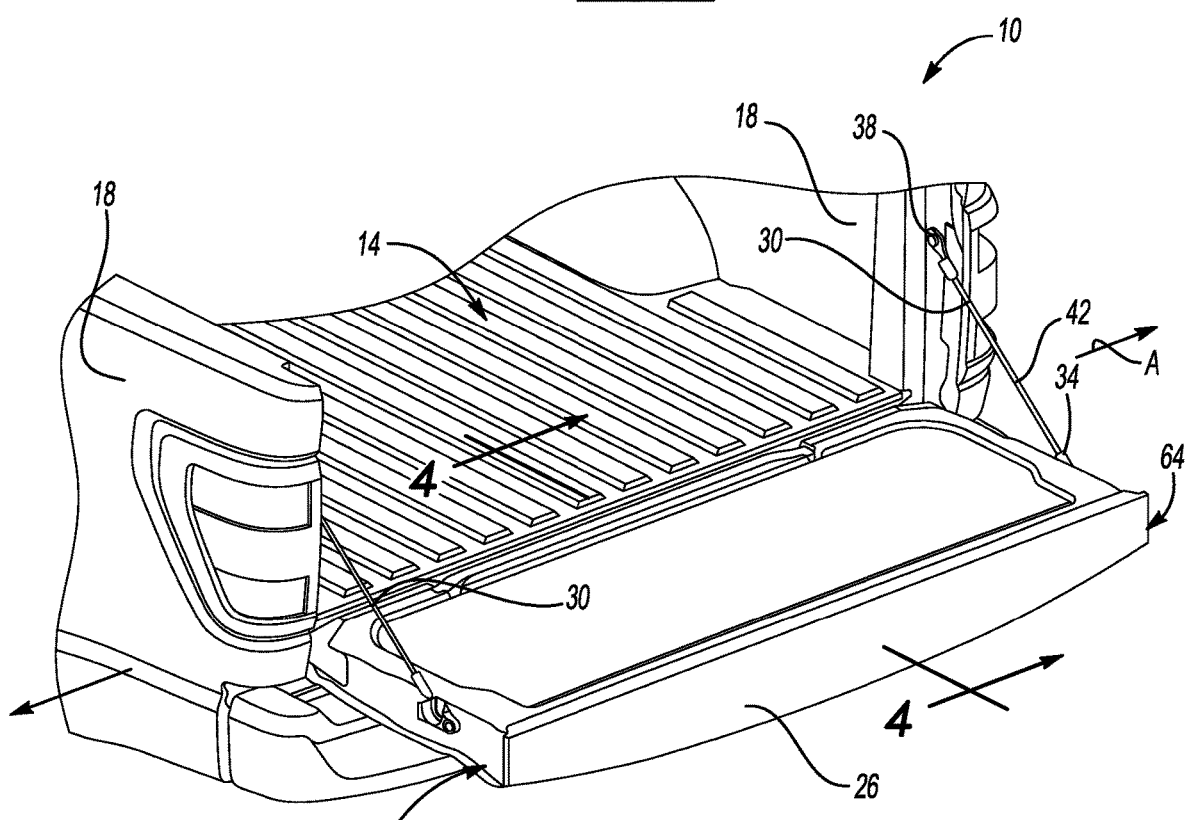
FIG. 2 illustrates the rear perspective view of FIG. 1 when the tailgate is in a fully open position.
Figure 3:
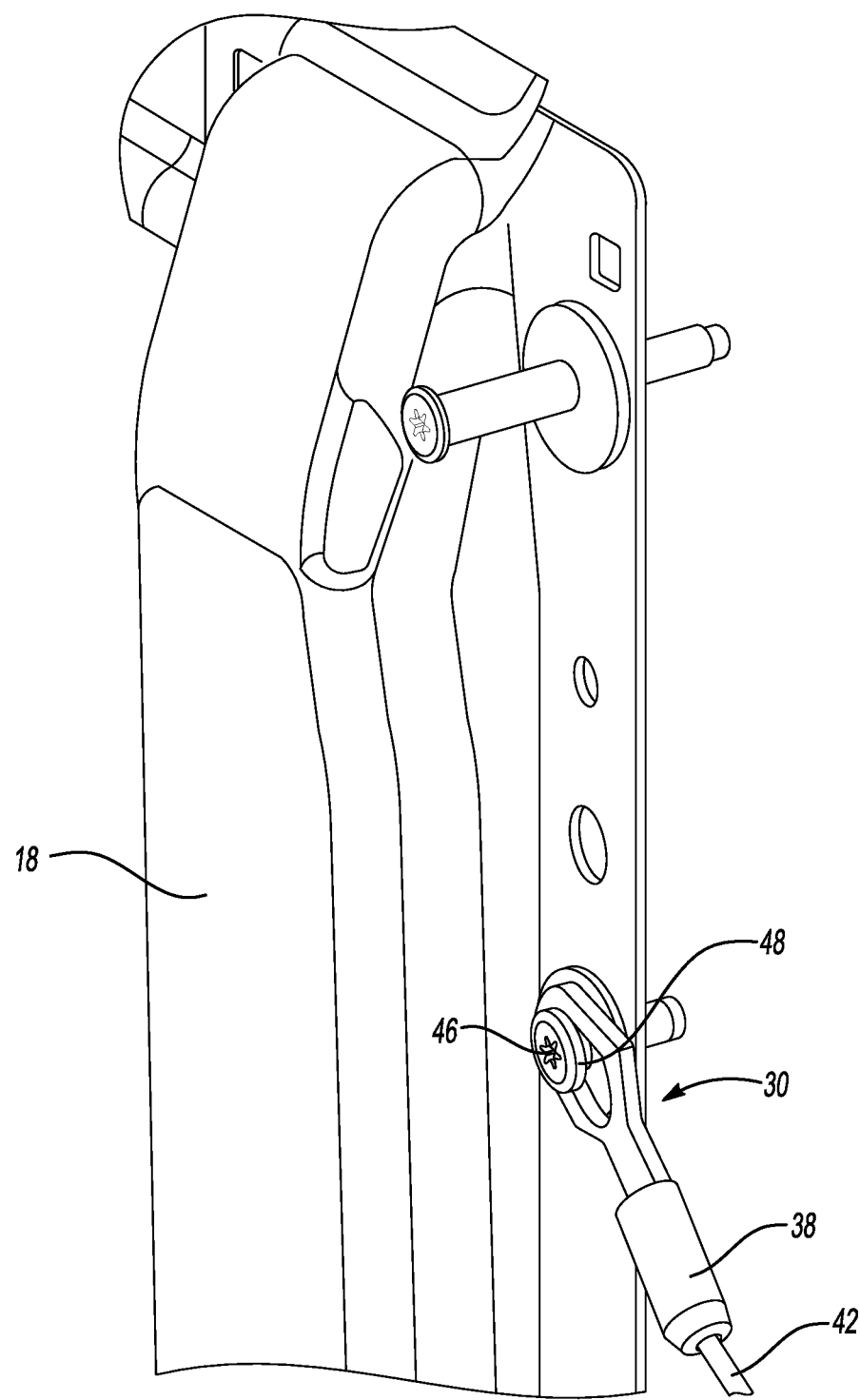
FIG. 3 shows a close-up view of a vehicle connector of a cable device coupled to a sidewall of the pickup truck in a first position when the tailgate is in the fully open position.

FIGS. 1-3 illustrate a vehicle 10, here a pickup truck, having a cargo bed 14 that is defined by a pair of sidewalls 18, a front wall 22, and a tailgate 26 according to an exemplary aspect of the present disclosure. The tailgate 26 is pivotable about a pivot axis A between a closed position shown in FIG. 1 and a fully open position, shown in FIG. 2.

The example tailgate 26 is vertically aligned when in the closed position and horizontally aligned when in the fully open position. Vertical and horizontal, for purposes of this disclosure, are with reference to ground and the ordinary orientation of the vehicle 10 during operation.

Cable devices 30 provide a tailgate support system that helps to support the tailgate 26 when in the fully open position. The exemplary tailgate support system includes two cable devices 30—one on a passenger side and one on a driver side.

In the exemplary embodiment, the cable devices 30 each include a tailgate connector 34, a vehicle connector 38, and a cable 42 extending therebetween. The tailgate connector 34 couples the respective cable device 30 to a laterally facing side of the tailgate 26. The connection can be made using a mechanical fastener, for example.

The vehicle connector 38 couples the cable device 30 to one of the sidewalls 18 of the vehicle 10. In the exemplary embodiment, as shown in FIG. 3, the vehicle connector 38 is coupled to the sidewall 18 via a mechanical fastener 46 that extends through an aperture 48 within the vehicle connector 38 of the cable device 30. The vehicle connector 38 can be placed over the mechanical fastener 46 and held in position by a flat spring or spring tab, for example.

Figure 4:
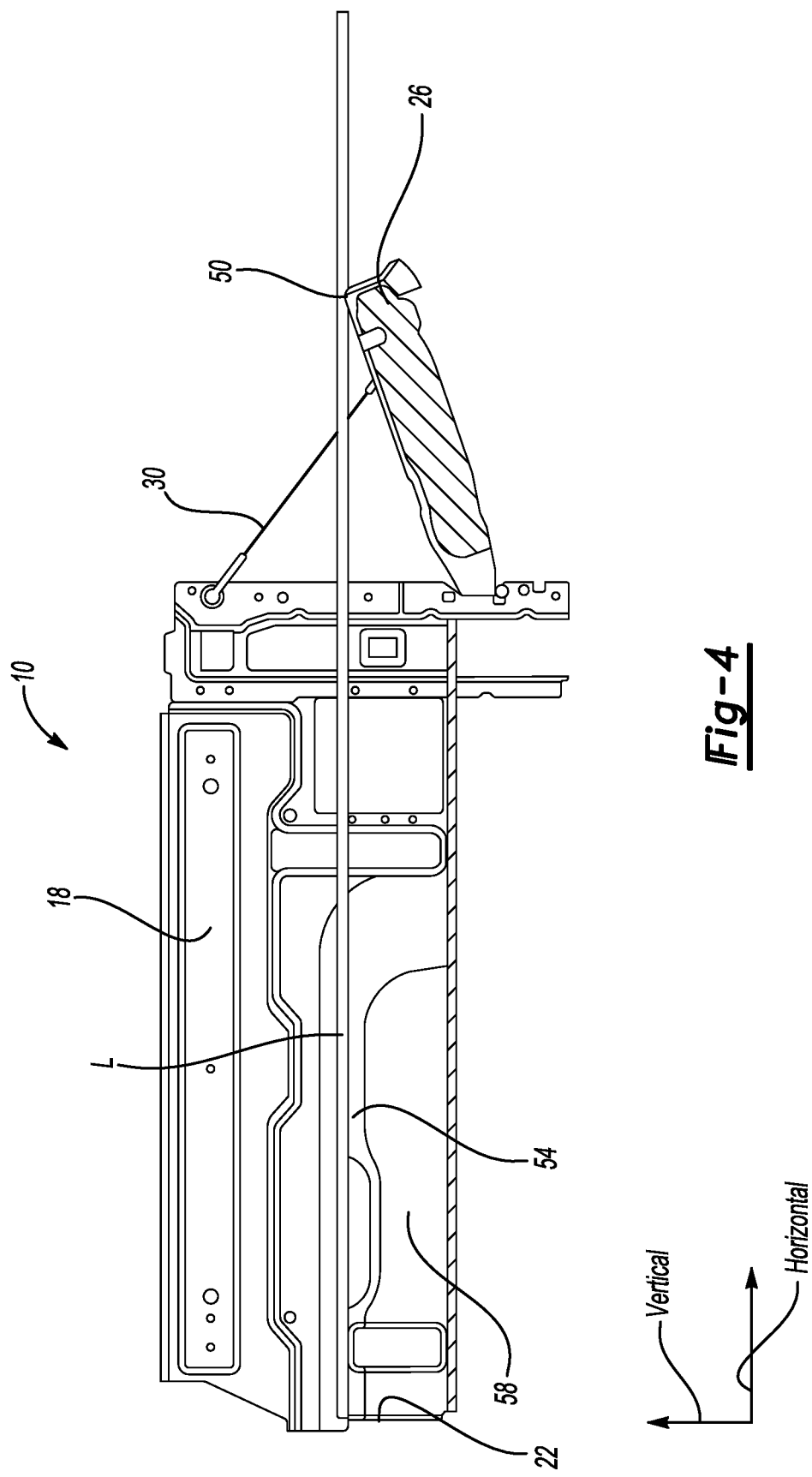
FIG. 4 illustrates a sectional view taken at line 4-4 in FIG. 2 when the tailgate is in a secondary position and supporting a load.

The tailgate 26 is movable to the secondary position, shown in FIG. 4, which is a position between the closed position and the fully open position. In the secondary position, the tailgate 26, and particularly an uppermost area 50 of the tailgate 26, can be used to support a load L, which is a sheet of material in this example. The material could be plywood or drywall. The uppermost area 50 is utilized to support a rear of the load L while a forward portion of the load L rests upon an uppermost area 54 of wheel wells 58 of the sidewalls 18.

To facilitate supporting the load L, the secondary position is established such that the uppermost area 50 of the tailgate 26 is vertically aligned with the uppermost areas 54 of the wheel wells 58 when the tailgate 26 is in the secondary position.

Figure 5:
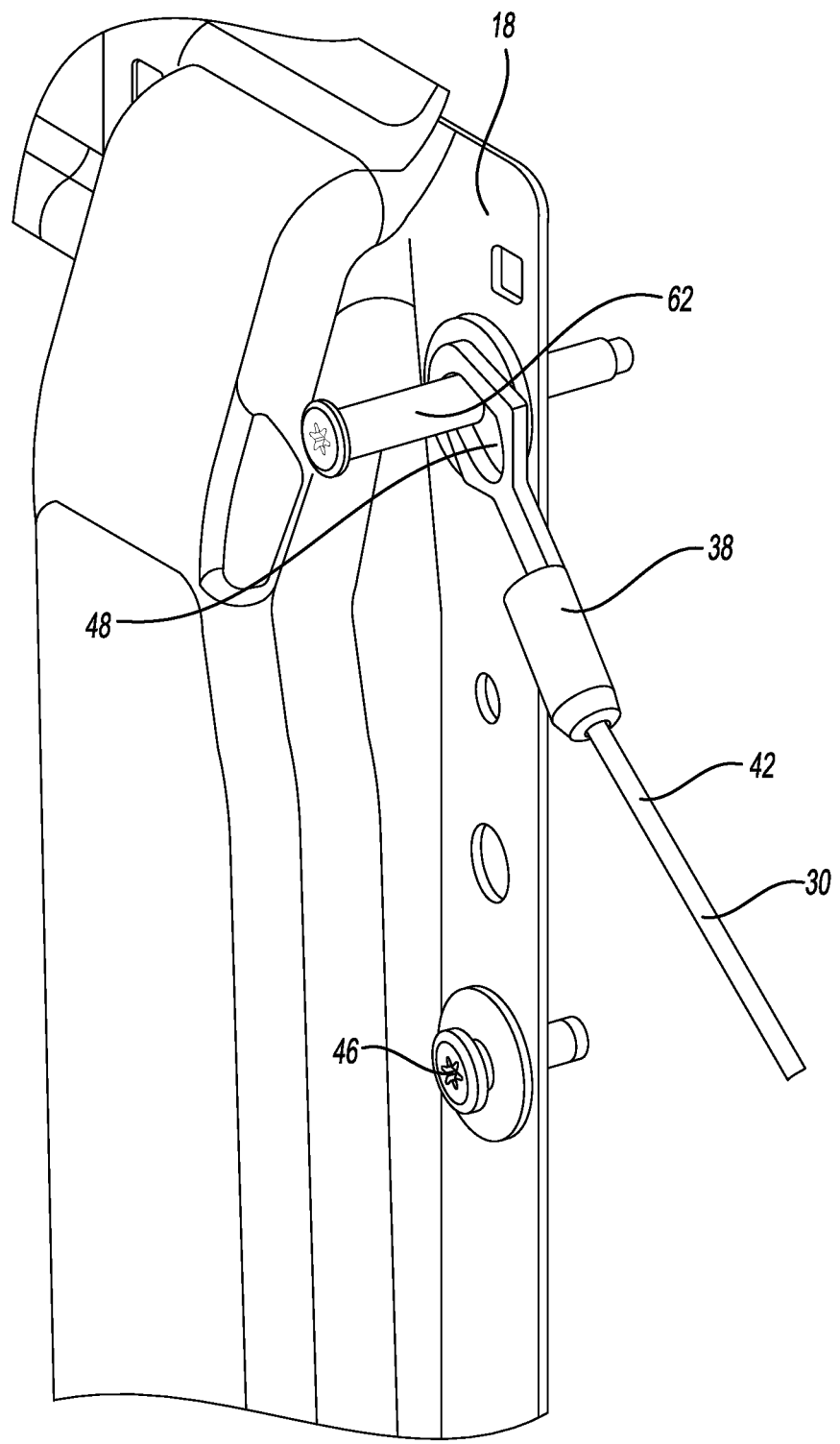
FIG. 5 shows the vehicle connector of FIG. 3 coupled to the sidewall in a second position when the tailgate is in the secondary position.

The cable device 30 is repositioned from the position of FIGS. 2 and 3 to the position of FIGS. 4 and 5 so that the cable device 30 can support the tailgate 26 in the secondary position. Repositioning the cable device 30 from the position of FIGS. 2 and 3 to the position of FIGS. 4 and 5 involves first removing the vehicle connector 38 from being positioned over the mechanical fastener 46. A user repositioning the cable device 30 may need to flex the flat spring to create clearance necessary to move the vehicle connector 38 over the head of the mechanical fastener 46. After removing the vehicle connector 38 from being positioned over the mechanical fastener 46, the vehicle connector 38 of the cable device 30 is then placed over a striker 62 of the sidewall 18. Notably, in the exemplary embodiment, the striker 62 is received within the aperture 48 of the vehicle connector 38, which is the same aperture 48 that receives the mechanical fastener 46 when the cable device 30 is supporting the tailgate 26 in the fully open position.

Positioning vehicle connector 38 over the striker 62 couples the cable device 30 to the sidewall 18 at a position that is vertically higher than where the vehicle connector 38 is coupled to the sidewall 18 in FIGS. 2 and 3. This raised coupling position facilitates the cable device 30 supporting the tailgate 26 in the secondary position of FIGS. 4 and 5. In particular, in this example, the cable device 30 is considered to couple to the sidewall 18 in a first position shown in FIG. 3 when supporting the tailgate 26 in the fully open position. When the cable device 30 is supporting the tailgate 26 in the secondary position, the cable device 30 is coupled to the sidewall 18 in a second position as shown in FIG. 5, which is vertically above the first position.

Latches 64 (FIG. 2) of the tailgate 26 engage the striker 62 to hold the tailgate in the closed position of FIG. 1. Notably, because the cable device 30 is configured such that the vehicle connector 38 can couple to the sidewall 18 through the striker 62, effectively no additional or specialized structure is required to couple the cable device 30 to the sidewall 18 in the second position.

The cable device 30 extends linearly from the tailgate connector 34 to the vehicle connector 38 when the cable device 30 is supporting the tailgate 26 in the fully open position and when the cable device is supporting the tailgate 26 in the secondary position. Also, a distance between the tailgate connector 34 and the vehicle connector 38 is the same when the cable device 30 is supporting the tailgate 26 in the fully open position and when the cable device is supporting the tailgate 26 in the secondary position. Looping the cable device 30 around another structure to effectively shorten a length of the cable device 30 is not required due to the decoupling and recoupling of the vehicle connector portion of the cable device 30.

An exemplary method of utilizing the tailgate support system can include first supporting the tailgate 26 in the fully open position using the tailgate support system, which in this example includes the cable device 30 on a passenger side and another cable device 30 on a driver side of the tailgate 26. To transition the tailgate 26 to the secondary position, the cable devices 30 are decoupled from the respective sidewalls 18 and then coupled to respective strikers of the sidewalls 18. The tailgate 26 can then be supported in the secondary position of FIG. 3 by the tailgate support system.

In the past, some tailgates have been supported at positions between fully open and fully closed positions. However, the mechanisms and systems utilized to support the tailgate have required relatively complex and specialized additional components.

Figure 6:
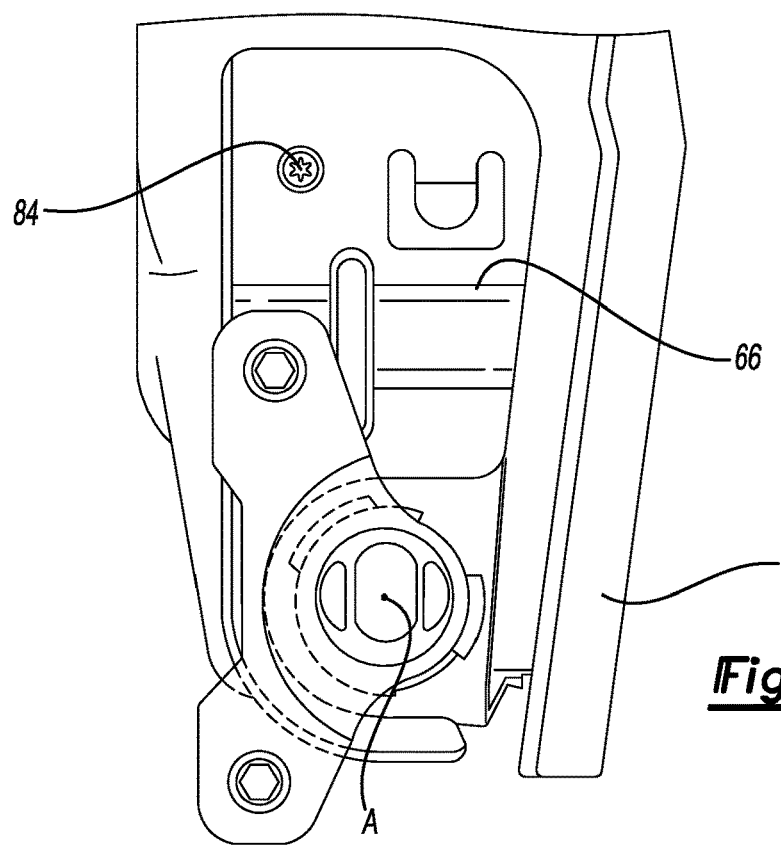
FIG. 6 illustrates a close-up view of an anti-removal bracket secured directly to the tailgate when the tailgate is in the closed position.

With reference now to FIG. 6, a bracket 66 can be secured directly to a passenger side of the tailgate 26. A similar bracket can be secured to a driver side of the tailgate 26.

The bracket 66 is configured to block removing or dislodging of the tailgate 26 from the vehicle 10. Such removal may be the result of an unauthorized user attempting to remove the tailgate 26. In another example, the tailgate 26 could potentially dislodge when the vehicle 10 is driven and the tailgate 26 is in the fully open position of FIG. 2 or the secondary position of FIG. 4. The exemplary bracket 66 blocks such removal of the tailgate 26 when the tailgate 26 is in both the secondary position of FIG. 3 and the fully open position of FIG. 1.

Figure 7A:
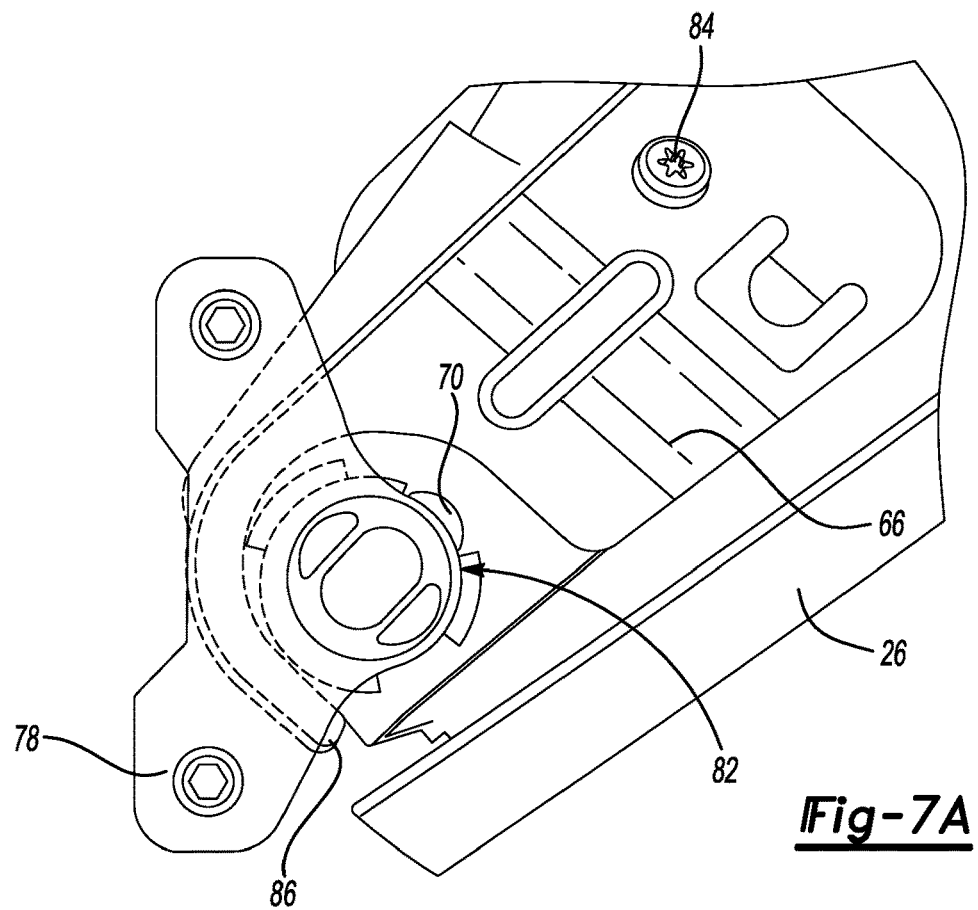
FIGS. 7A-7C illustrates various close-up views of the anti-removal bracket of FIG. 6 when the tailgate is in the secondary position.
Figure 7B:
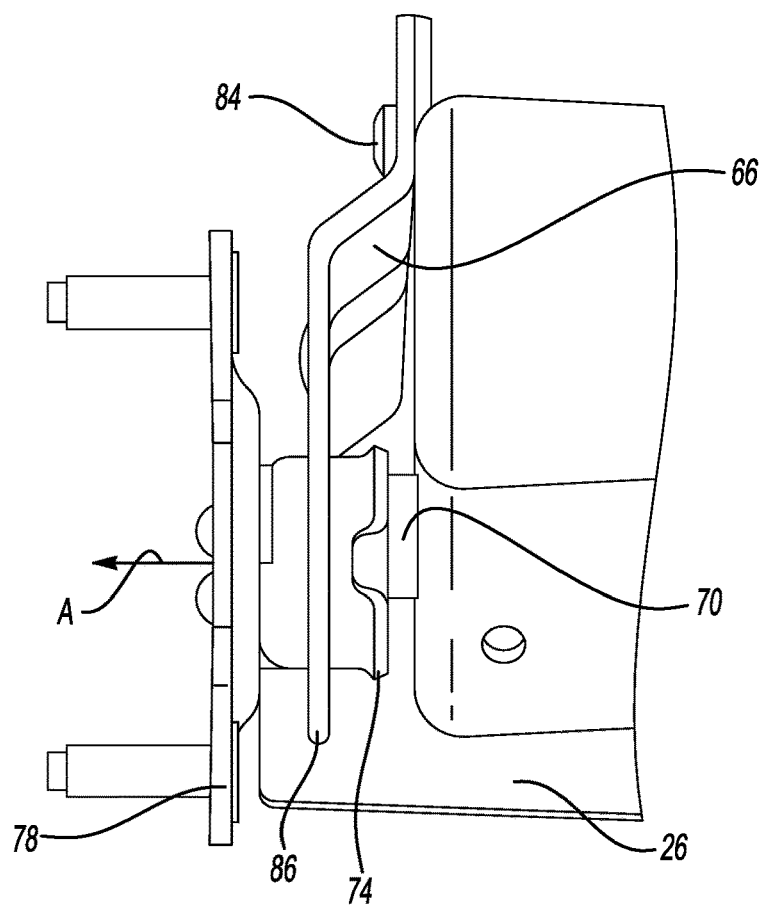
Figure 7C:
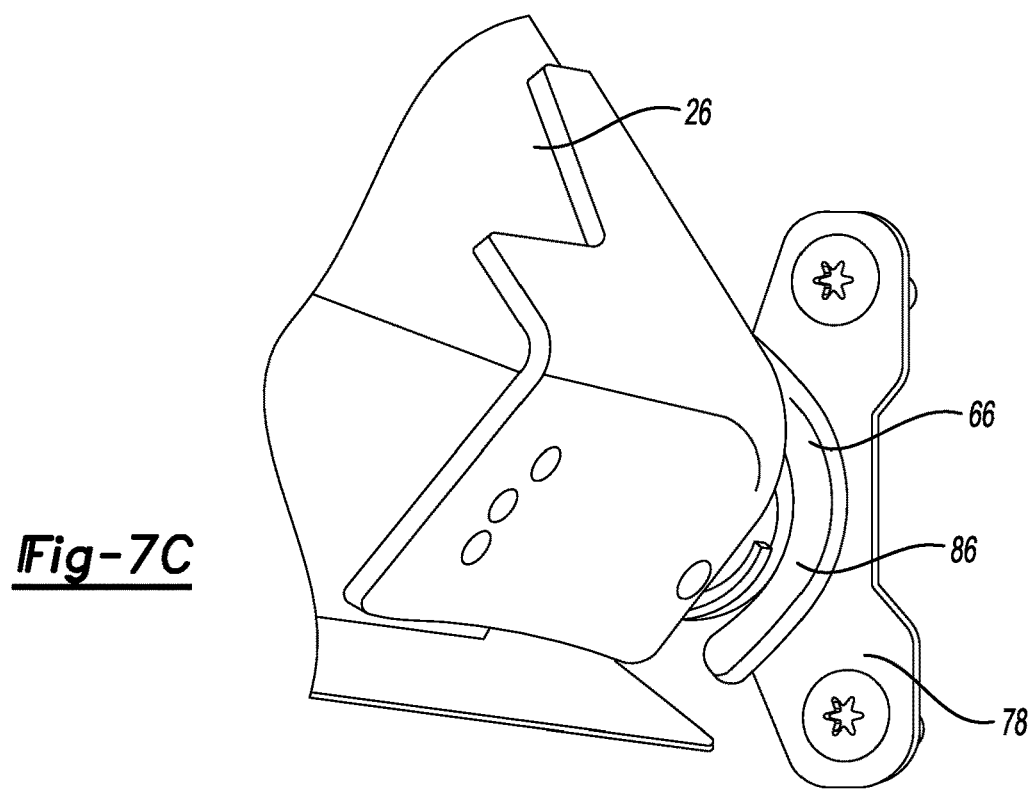

As shown in FIGS. 7A-7C, the exemplary tailgate 26 includes a pivot pin 70 that extends laterally from the vehicle 10. The pivot axis A extends through the pivot pin 70. The tailgate 26 is pivotably coupled to the vehicle 10 by fitting the pivot pin 70 within a cupped member 74 that is directly connected to the vehicle 10 via a bracket 78. The pivot pin 70 can rotate within the cupped member 74 to enable the pivoting of the tailgate 26 between the closed position and the fully open position or secondary position.

To remove the tailgate 26 from the vehicle 10, the cupped member 74 includes a slot 82. The slot 82 provides clearance for the pivot pin 70 to lift and withdraw from within the cupped member 74 so that the tailgate 26 can be removed.

To block such removal, the bracket 66 includes a hooked-shaped finger 86 that extends circumferentially at least partially about the pivot axis A and the pivot pin 70. If the tailgate 26 is moved such that the pivot pin 70 begins to slide within the slot 82 of the cupped member 74, the finger 86 contacts the cupped member 74 to prevent the tailgate 26 from fully detaching from the vehicle 10. In this example, the bracket 66, due to the hooked finger 86, extends circumferentially about the pivot axis A and the pivot pin 70 at least 180°.

In this example, the bracket 66 is secured to the tailgate 26 via a mechanical fastener 84. To remove a tailgate 26, the mechanical fastener 84 needs to removed so that the bracket 66 can be detached from the tailgate 26. After the bracket 66 is detached from the tailgate 26, the tailgate 26 can be removed from the vehicle 10 without the bracket 66 interfering.

The bracket 66 can block unauthorized removal of the tailgate 26 or, at least, can lengthen the time required to remove the tailgate 26. This is because, the bracket 66 must be detached from the tailgate rather than simply lifting the tailgate 26 away from the cupped member 74.

Figure 8:
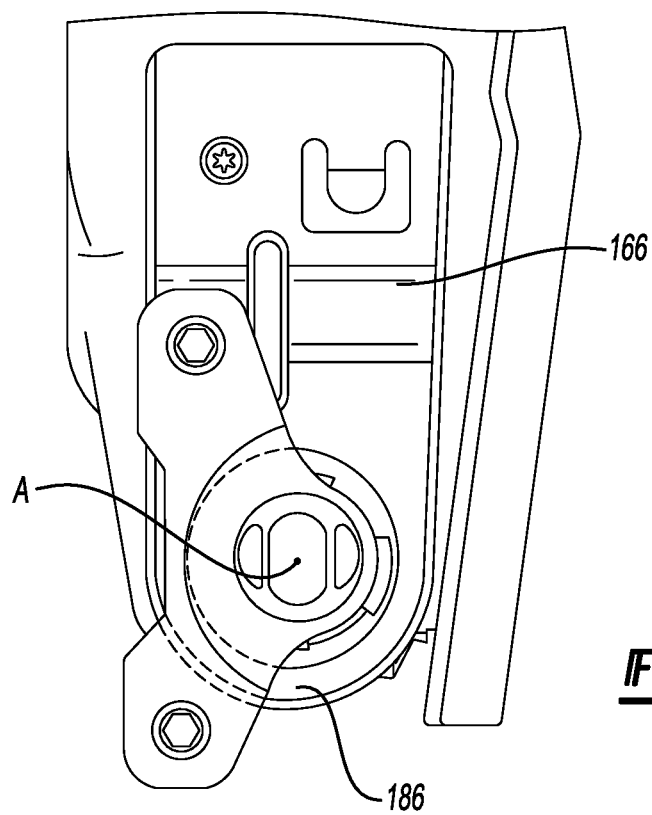
FIG. 8 illustrates a close-up view of an anti-removal bracket according to another exemplary aspect of the present disclosure.
Figure 9:
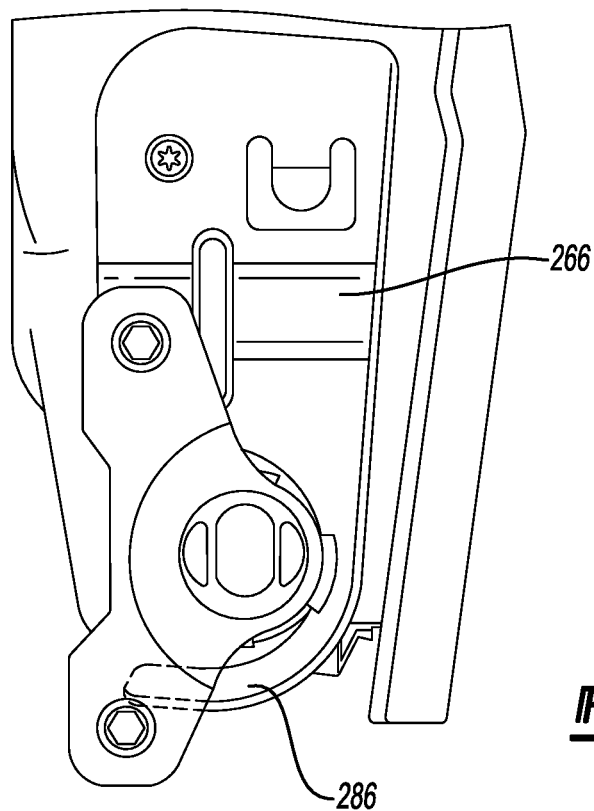
FIG. 9 illustrates a close-up view of an anti-removal bracket according to yet another exemplary aspect of the present disclosure.

The bracket 66 could have many forms. With reference to FIG. 8, another example bracket 166 has a finger portion 186 that extends circumferentially about the entire pivot axis A. With reference to FIG. 9, another example bracket 266 has a hooked-shaped finger 286 configured to extend around a rear side of the pivot pin rather than a forward side like the finger 86 of the bracket 66.

In some examples, the mechanical fastener 84 can be replaced or used in connection with a keyed lock, such as the type of lock commonly used to secure laptop computers. Using the keyed lock can help to ensure that only an authorized user is removing the bracket 66, 166, 266.

Features of the disclosed examples include using a common vehicle connector of a cable device to attach the cable device to a vehicle body when holding the tailgate in a fully open position and when holding the tailgate in a secondary position. Removal of the tailgate is blocked by a bracket that attaches directly to the tailgate.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A tailgate assembly for a vehicle, comprising:
   a tailgate configured to pivot relative to a vehicle body between a closed position, a fully open position, and a secondary position that is between the closed position and the fully open position;
   at least one cable device having a tailgate connector and a vehicle connector, the tailgate connector coupled to the tailgate, the vehicle connector coupled to a sidewall of the vehicle in a first position to support the tailgate when the tailgate is in the fully open position, the vehicle connector coupled to the sidewall of the vehicle in a second position to support the tailgate when the tailgate is in the secondary position, the first position vertically below the second position; and
   a bracket configured to block removal of the tailgate from the vehicle body when the tailgate is in the fully open position and when the tailgate is in in the secondary position,
   wherein the bracket is configured such that removing the bracket from the tailgate is necessary to decouple the tailgate from the vehicle.

2. The tailgate assembly of claim 1, wherein the tailgate pivots relative to the vehicle body about a pivot axis, wherein the bracket extends circumferentially about the pivot axis.

3. The tailgate assembly of claim 2, wherein the bracket extends circumferentially at least 180 degrees about the pivot axis.

4. The tailgate assembly of claim 2, wherein the bracket includes a hook-shaped finger portion that extends at least partially about the pivot axis.

5. The tailgate assembly of claim 2, further comprising a mechanical fastener that secures the bracket to the tailgate.

6. The tailgate assembly of claim 1, wherein the at least one cable device includes a cable extending from the tailgate connector to the vehicle connector.

7. The tailgate assembly of claim 1, further comprising a mechanical fastener, wherein the vehicle connector includes an aperture that receives the mechanical fastener to secure the vehicle connector to the sidewall when the tailgate is in the fully open position, wherein the aperture receives a striker when the tailgate is in the secondary position.

8. The tailgate assembly of claim 1, wherein the at least one cable device extends linearly from the tailgate connector to the vehicle connector when the tailgate is in the fully open position and when the tailgate is in the secondary position.

9. The tailgate assembly of claim 1, wherein the bracket, when secured to the tailgate, is configured to block removal of the tailgate from the vehicle body when the tailgate is in the fully open position, the secondary position, and all positions between the fully open position and the secondary position.

10. A tailgate support system, comprising:
a cable extending from a tailgate connector to a vehicle connector;
the tailgate connector configured to couple to a tailgate of a vehicle;
the vehicle connector configured to couple to a vehicle sidewall at a first position when the tailgate is in a fully open position, and to couple to the vehicle sidewall at a second position when the tailgate is in a secondary position, the second position vertically higher than the first position,
the vehicle connector including an aperture that receives a mechanical fastener when the vehicle connector is coupled to the vehicle sidewall at the first position, the aperture receiving a striker of the vehicle to couple the vehicle connector to the vehicle sidewall in the second position; and
a bracket configured to block removal of the tailgate from a vehicle body of the vehicle when the tailgate is in the fully open position and when the tailgate is in the secondary position,
wherein the bracket is configured such that removing the bracket from the tailgate is necessary to decouple the tailgate from the vehicle.

11. The tailgate support system of claim 10, wherein the bracket is secured to the tailgate and the bracket is configured such that detaching the bracket from the tailgate is necessary to remove the tailgate from the vehicle body.

12. A method of attaching a tailgate to a vehicle, the method comprising:
providing a tailgate support system having a tailgate connector, a vehicle connector, and a cable member extending therebetween;
supporting a tailgate in a fully open position using the tailgate support system, the tailgate support system having the tailgate connector coupled to a tailgate and the vehicle connector coupled to a sidewall of a vehicle in a first position when supporting the tailgate in the fully open position;
decoupling the vehicle connector from a vehicle sidewall;
coupling the vehicle connector to a striker of the vehicle sidewall in a second position that is vertically above the first position; and
supporting the tailgate in a secondary position when the vehicle connector is coupled to the striker, wherein the tailgate is pivotably coupled to the vehicle, and further comprising using a bracket attached to the tailgate to block the tailgate from decoupling from a vehicle body of the vehicle when the tailgate is in the fully open position and when the tailgate is in the secondary position,
wherein the bracket is configured such that removing the bracket from the tailgate is necessary to decouple the tailgate from the vehicle.

13. The method of claim 12, further comprising supporting a sheet of material on an uppermost area of the tailgate when the tailgate is in the secondary position.

14. The method of claim 12, wherein the tailgate pivots relative to the vehicle body about a pivot axis, wherein the bracket includes a hook-shaped finger portion that extends at least partially about the pivot axis of the tailgate.

15. The method of claim 12, wherein the bracket blocks the tailgate from decoupling from the vehicle at all positions between the fully open position and the secondary position.

* * * * *